(12) United States Patent
Hermez et al.

(10) Patent No.: US 12,368,313 B2
(45) Date of Patent: Jul. 22, 2025

(54) CHARGE CONTROLLER

(71) Applicant: Rivian IP Holdings, LLC, Plymouth, MI (US)

(72) Inventors: Martin Hermez, West Bloomfield, MI (US); Do Hyun Yoon, Irvine, CA (US); Tyler Jennings Bennett, Long Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 661 days.

(21) Appl. No.: 17/710,311

(22) Filed: Mar. 31, 2022

(65) Prior Publication Data

US 2023/0073846 A1 Mar. 9, 2023

Related U.S. Application Data

(60) Provisional application No. 63/241,325, filed on Sep. 7, 2021.

(51) Int. Cl.
*H02J 7/00* (2006.01)
(52) U.S. Cl.
CPC .......... *H02J 7/00716* (2020.01); *H02J 7/005* (2020.01); *H02J 7/007182* (2020.01); *H02J 7/007194* (2020.01)
(58) Field of Classification Search
None
See application file for complete search history.

(56) References Cited

U.S. PATENT DOCUMENTS

| 2014/0253039 A1* | 9/2014 | Barsukov | H02J 7/007184 320/112 |
| 2016/0006272 A1* | 1/2016 | Greening | H02J 7/00712 320/162 |
| 2016/0298589 A1* | 10/2016 | Setterberg | H02J 7/1423 |

OTHER PUBLICATIONS

Recurrent, "Deep Dive: Volts, Amps, and Charging Speeds," published Aug. 30, 2023, retrieved Nov. 6, 2024 (Year: 2023).*

* cited by examiner

*Primary Examiner* — Richard Isla
*Assistant Examiner* — Ryu-Sung P. Weinmann
(74) *Attorney, Agent, or Firm* — Foley & Lardner LLP (57) ABSTRACT

A charge controller that responds to extreme transients in current, voltage, and temperature. The charge controller monitors the drift of the battery charging rate versus its request and compensates for wind up that may lead to uncontrolled current into a high-voltage battery. This bi-directional anti-wind up charge controller allows the battery management system to independently adjust the current request to the charger, which is primarily useful during vehicle component failure; charger side faults, over-commend, or uncontrolled current; and allows for safe and continuous charging during unexpected charger events. A dynamic saturation bound allows the charge controller to adjust its requested current and compensate for auxiliary current draws when the charger is capable of providing more current. The charge controller switches between voltage and current control based on the voltage of the battery, adjusting for variability in state-of-health, and temperature of the battery pack.

20 Claims, 9 Drawing Sheets

CHARGE CONTROLLER

CROSS-REFERENCE TO RELATED APPLICATION

The present disclosure claims the benefit of priority of U.S. Provisional Patent Application 63/241,325, filed on Sep. 7, 2021, and entitled "CHARGE CONTROLLER," the contents of which are incorporated in full by reference herein.

INTRODUCTION

The present disclosure relates generally to the automotive and battery management fields. More particularly, the present disclosure relates to an anti-wind up charge controller for a battery management system of an electric vehicle (EV), hybrid electric vehicle (HEV), or the like.

While charging an EV, for example, there are a host of variables that can impact the controllability and efficiency of a charge session. Designing for every possible use case using a discrete case-by-case system may result in undesirable "blind spots." In a worst case scenario, this may lead to battery overcharging and battery life degradation or battery failure. Utilizing a standard control strategy for all batteries and EVs may also result in less-than-optimal battery charging (in terms of energy per minute).

The present introduction is provided as illustrative environmental context only and should not be construed as being limiting in any manner. It will be readily apparent to those of ordinary skill in the art that the concepts and principles of the present disclosure may be applied in other environmental contexts equally and without limitation.

SUMMARY

The present disclosure provides a charge controller that responds to extreme transients in current, voltage, and temperature. The charge controller monitors the drift of the battery charging rate versus its request and compensates for error wind up that may lead to uncontrolled current into a high-voltage battery. This bi-directional anti-wind up charge controller allows the battery management system to independently adjust the current request to the charger, which is primarily useful during vehicle component failure; charger side faults, over-command, or uncontrolled current; and allows for safe and continuous charging during unexpected charger events. A dynamic saturation bound allows the charge controller to adjust its requested current and compensate for auxiliary current draws when the charger is capable of providing more current. This is accomplished while adhering to the charging limit computed by the battery management system. This is primarily useful in high-auxiliary current draw use cases, including cabin heating, ventilation, and air conditioning (HVAC) uses; battery pack thermal management; and other direct current to direct current (DC/DC) conversion load consumption. The charge controller switches between voltage and current control based on the voltage of the battery, adjusting for variability in state-of-health (SOH), and temperature of the battery pack.

In one illustrative embodiment, the present disclosure provides a charge controller. The charge controller includes one or more processors and a memory. The memory stores computer-executable instructions that, when executed, cause the one or more processors to determine a target charging current request for a battery from a charger based on inputs that are current-based and wind-up feedback correction provided by a feedback loop.

In another illustrative embodiment, the present disclosure provides a charge control method. The method includes obtaining inputs that are current-based. The method also includes determining a target charging current request for a battery from a charger based on the inputs that are current-based and wind-up feedback correction provided by a feedback loop.

In a further illustrative embodiment, the present disclosure provides a charge control method. The method includes determining, in response to a voltage of a battery being below a threshold voltage, a target charging current request for a battery from a charger based on inputs that are current-based. The method also includes determining, in response to the voltage of the battery being at or above the threshold voltage, the target charging current request for the battery from the charger based on inputs that are voltage-based.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, the present disclosure provides a charge controller that responds to extreme transients in current, voltage, and temperature. The charge controller monitors the drift of the battery charging rate versus its request and compensates for error wind up that may lead to uncontrolled current into a high-voltage battery. This bi-directional anti-wind up charge controller allows the battery management system to independently adjust the current request to the charger, which is primarily useful during vehicle component failure; charger side faults, over-commend, or uncontrolled current; and allows for safe and continuous charging during unexpected charger events. A dynamic saturation bound allows the charge controller to adjust its requested current and compensate for auxiliary current draws when the charger is capable of providing more current. This is accomplished while adhering to the charging limit computed by the battery management system. This is primarily useful in high-auxiliary current draw use cases, including cabin heating, ventilation, and air conditioning (HVAC) uses; battery pack thermal management; and direct current-direct current (DCDC) consumption. The charge controller switches between voltage and current control based on the state-of-charge (SOC) window, adjusting for variability in state-of-health (SOH), and temperature of the battery pack. This is unique to each vehicle, and the charge controller is able to control to a precision of about 2 mV.

Figure 1:
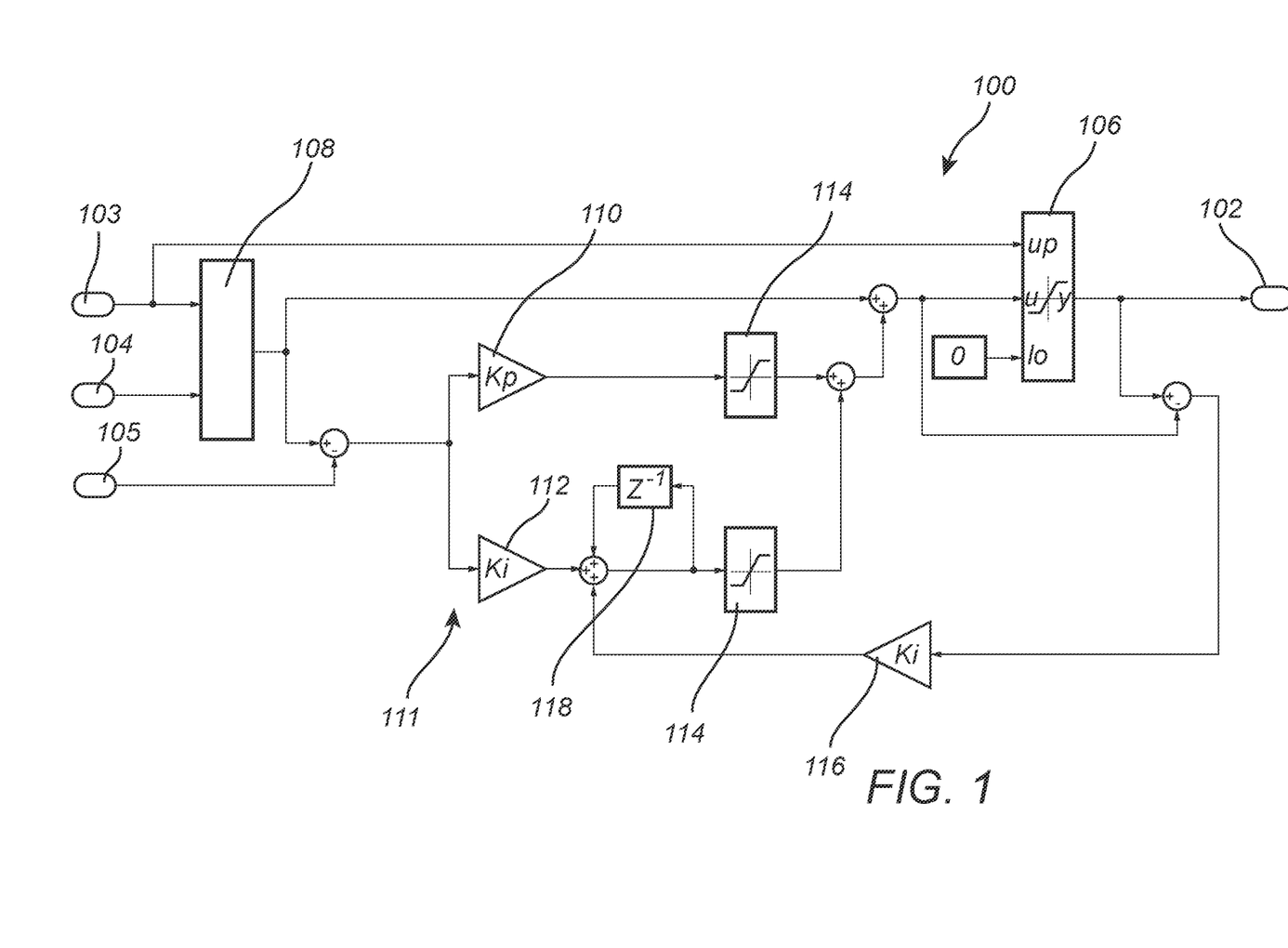
FIG. 1 is a schematic diagram of one illustrative embodiment of the anti-wind up charge controller of the present disclosure, highlighting a current-based implementation.

FIG. 1 is a schematic diagram of one illustrative embodiment of the anti-wind up charge controller 100 of the present disclosure, highlighting a current-based implementation. Referring specifically to FIG. 1, in one illustrative embodiment of the current-based implementation, the charge controller 100 of the present disclosure is operable for requesting a charging target current 102 based on inputs 103, 104, 105 that are current-based. In various embodiments, the inputs 103, 104, 105 include a charger/Electric Vehicle Supply Equipment (EVSE) current limit 103, a battery current limit 104, and a measured battery current 105. In various embodiments of the current-based implementation, the charger/EVSE current limit 103 is a set range with a minimum value and a maximum value. In various embodiments, the set range is based on a particular application of the battery, such as based on a size of the vehicle, a desired performance of the vehicle, and the like. For example, the set range can be a predetermined range, such as from 200 Amps to 300 Amps or from 300 Amps to 500 Amps. In some embodiments, the set range can be much higher, such as for large trucking applications. In various embodiments, the set range of the battery current limit 104 is adjusted based on the battery SOC/voltage, the battery SOH, and the battery temperature. In various embodiments of the current-based implementation, the measured battery current 105 is based on a current charging state of the battery.

In various embodiments of the current-based implementation, the maximum possible value of the charger/EVSE current limit 103 acts as a maximum charging current that can possibly be provided during the charging of the battery. Thus, in embodiments, the maximum value for the charger/EVSE current limit 103 acts as an upper saturation bound 106 for the request.

In various embodiments of the current-based implementation, a minimum of the charger/EVSE current limit 103 and the battery current limit 104 is utilized to determine a limiting charging current 108. As such, the minimum of the charger/EVSE current limit 103 and the battery current limit 104 may ultimately be safely requested by the charge controller 100.

In various embodiments of the current-based implementation, the charge controller 100 includes a feedback controller 111 that is fed the limiting charging current 108 and measured battery current 105. In the embodiment illustrated, the feedback controller 111 includes a proportional-integral (PI) controller that includes a proportional gain path (Kp) 110 and an integral gain path (Ki) 112. In other embodiments, the feedback controller 111 includes any of the PI controller, a proportional controller, a derivative controller, a proportional-integral-derivative controller, feed-forward controller, and the like. The proportional gain path (Kp) 110 is configured to add/subtract from a request for error correction. The integral gain path (Ki) 112 is configured to prevent oscillation by accounting for historical errors. In these embodiments, both the proportional gain path (Kp) 110 and the integral gain path (Ki) 112 are saturation bounded 114. In some embodiments, the saturation bound is different for each of the proportional gain path (Kp) 110 and the integral gain path (Ki) 112.

In various embodiments of the current-based implementation, the charge controller 100 includes an anti-wind up error gain/feedback loop 116. The anti-wind up error gain/feedback loop 116 feeds wind-up feedback correction to the feedback controller 111, such as to the integral gain path 112. The wind-up is the uncontrolled drift of the feedback controller while the battery current limit is beyond the maximum of the charger/EVSE current limit 103. The charge controller 100 is configured to monitor the wind-up downstream of the feedback controller 111 and provide a wind-up feedback correction to the feedback controller 111 via the anti-wind up error gain/feedback loop 116. In embodiments, the charge controller 100 determines the wind-up feedback correction by monitoring uncontrolled drift of the feedback controller through a dynamic feedback loop-and-gain on the integral term. With this dynamic closed loop feedback, the charge controller 100 can account for and minimize any wind-up error to prevent a build-up of such transient errors. Eliminating the uncontrolled drift of the feedback controller with the anti-wind up loop allows the feedback controller to react to changes in the battery current limit while still allowing to compensate for auxiliary High Voltage (HV) loads.

In embodiments, the integral gain path (Ki) 112 also incorporates an appropriate gain circuit 118 that is used along with the wind-up feedback correction received from the anti-wind up error gain/feedback loop 116, which results in transient errors being accounted for and minimized by the resulting requests.

Figure 2:
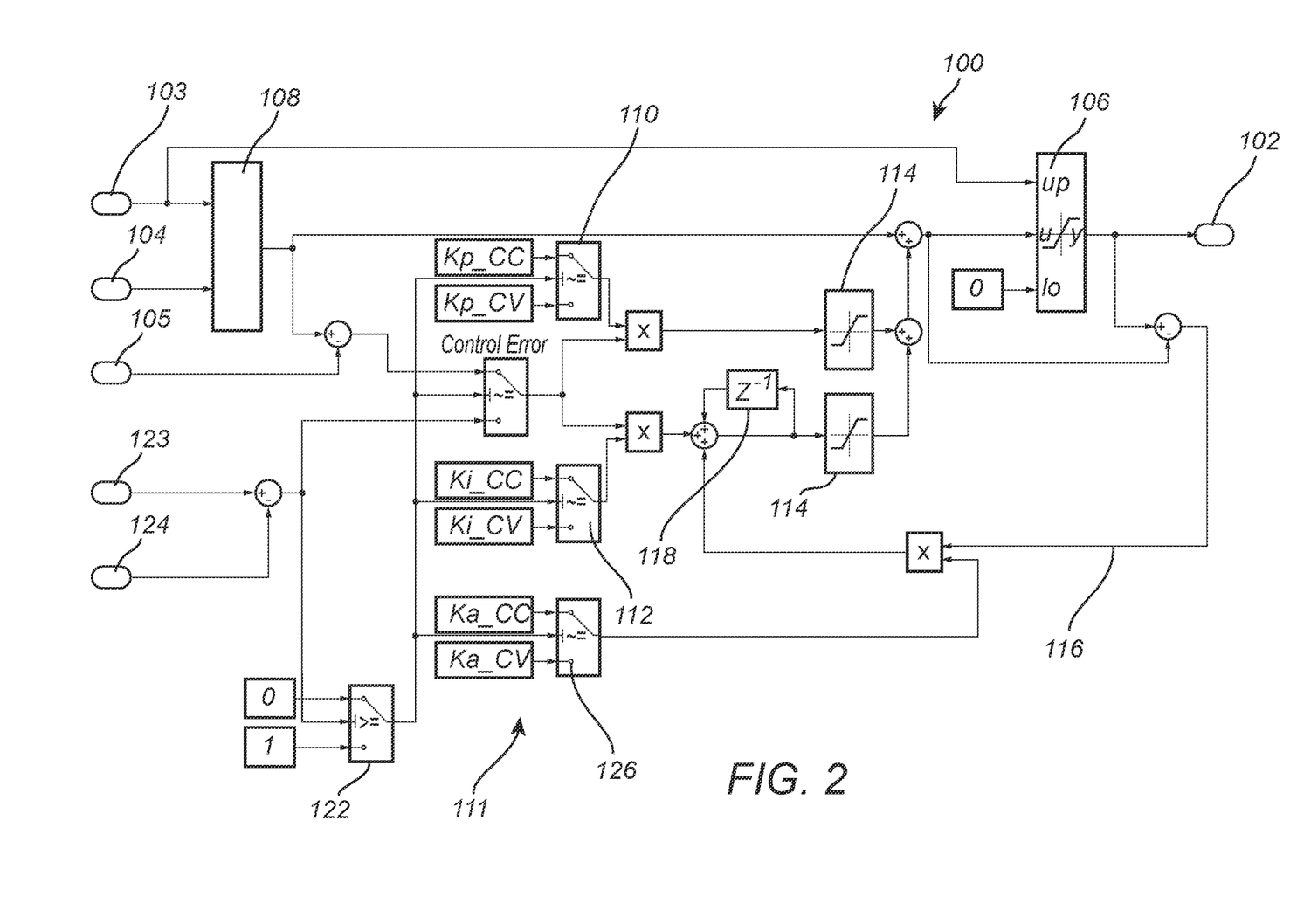
FIG. 2 is a schematic diagram of another illustrative embodiment of the anti-wind up charge controller of the present disclosure, highlighting a current and voltage-based implementation.

FIG. 2 is a schematic diagram of another illustrative embodiment of the anti-wind up charge controller 100 of the present disclosure, highlighting a current and voltage-based implementation. Referring specifically to FIG. 2, in an illustrative embodiment of the current and voltage-based implementation, the charge controller 100 of the present disclosure is again operable for requesting a charging target current 102 given multiple inputs 103, 104, 105 that are current-based. Similar to the embodiments discussed above with regards to the current-based implementation, in various embodiments of the current and voltage-based implementation, the inputs 103, 104, 105 include a charger/Electric Vehicle Supply Equipment (EVSE) current limit 103, a battery current limit 104, and a measured battery current 105. In various embodiments, the charger/EVSE current limit 103 is a set range with a minimum value and a maximum value. In various embodiments, the set range is based on a particular application of the battery, such as based on a size of the vehicle, a desired performance of the vehicle, and the like. For example, the set range can be a predetermined range, such as from 200 Amps to 300 Amps or from 300 Amps to 500 Amps. In some embodiments, the set range can be much higher, such as for large trucking applications. In various embodiments, the set range of the battery current limit 104 is adjusted based on the battery SOC/voltage, the battery SOH, and the battery temperature and the battery current limit 104 includes a minimum value and a maximum value, such as from 200 Amps to 300 Amps. In various embodiments of the current and voltage-based implementation, the measured battery current 105 is based on a current charging state of the battery.

In various embodiments of the current and voltage-based implementation, the maximum value of the charger/EVSE current limit 103 acts as a maximum charging current that can possibly be provided during the charging of the battery. Thus, in embodiments, the maximum value for the charger/EVSE current limit 103 acts as an upper saturation bound 106 for the request.

In various embodiments of the current and voltage-based implementation, the minimum value of the charger/EVSE current limit 103 and the minimum value of the battery current limit 104 may ultimately be safely requested by the charge controller 100 and are utilized to determine a limiting charging current 108.

In various embodiments of the current and voltage-based implementation, the charge controller 100 includes a feedback controller 111 that is fed the limiting charging current 108 and measured battery current 105. In some embodiments, the feedback controller 111 is a PI controller that includes a proportional gain path (Kp) 110 and an integral gain path (Ki) 112. In other embodiments, the feedback controller 111 includes any of the PI controller, a proportional controller, a derivative controller, a proportional-integral-derivative controller, and the like. The proportional gain path (Kp) 110 is configured to add/subtract from a request for error correction. The integral gain path (Ki) 112 is configured to prevent oscillation by accounting for historical errors. In these embodiments, both the proportional gain path (Kp) 110 and the integral gain path (Ki) 112 are saturation bounded 114. In some embodiments, the saturation bound is different for each of the proportional gain path (Kp) 110 and the integral gain path (Ki) 112.

In various embodiments of the current and voltage-based implementation, the charge controller 100 includes an anti-wind up error gain/feedback loop 116. The anti-wind up error gain/feedback loop 116 feeds wind-up feedback correction to the feedback controller 111, such as to the integral gain path 112. The charge controller 100 is configured to monitor the wind-up downstream of the feedback controller 111 and provide a wind-up feedback correction to the feedback controller 111 via the anti-wind up error gain/feedback loop 116.

In embodiments, the integral gain path (Ki) 112 also incorporates an appropriate gain circuit 118 that is used along with the wind-up feedback correction received from the anti-wind up error gain/feedback loop 116, which results in transient errors being accounted for and minimized by the resulting requests.

In various embodiments of the current and voltage-based implementation, the PI controller 111 also includes a control switch 126 configured to switch between voltage control and current control.

In various embodiments of the current and voltage-based implementation, the charge controller 100 is configured to selectively switch to the consideration of voltage, such as via a tracking error switch 120. In these embodiments, the PI controller 111 takes a voltage path 122 into account, using inputs 123, 124 that are voltage-based. In some of these embodiments, the inputs 123, 124 include a cell voltage target 123 and a maximum cell voltage 124. In this manner, the charge controller 100 can switch between current based control and voltage based control. In various embodiments, the charge controller 100 is configured to switch between current based control and voltage based control based on a voltage of the battery/battery cells.

In some embodiments, the charge controller 100 switches from current based control to voltage based control as a voltage threshold is reached. In some of these embodiments, the voltage threshold is a predetermined voltage that is defined at an amount that is close to the battery being fully charged and is predefined based on where small wind up errors may lead to a relatively large voltage overshoot. In embodiments, the predetermined voltage is a target voltage, such as max battery cell voltage. In other embodiments, the predetermined voltage is a voltage range, such as within a one millivolt (mV) window of max battery cell voltage. In various embodiments, the voltage threshold is adjusted for variability in the SOH of the battery and for a temperature of the battery pack.

In various embodiments, the charge controller 100 controls the current into a pack and diverts excess current to other systems of the vehicle, such as the thermal management system, for example.

Figure 3:
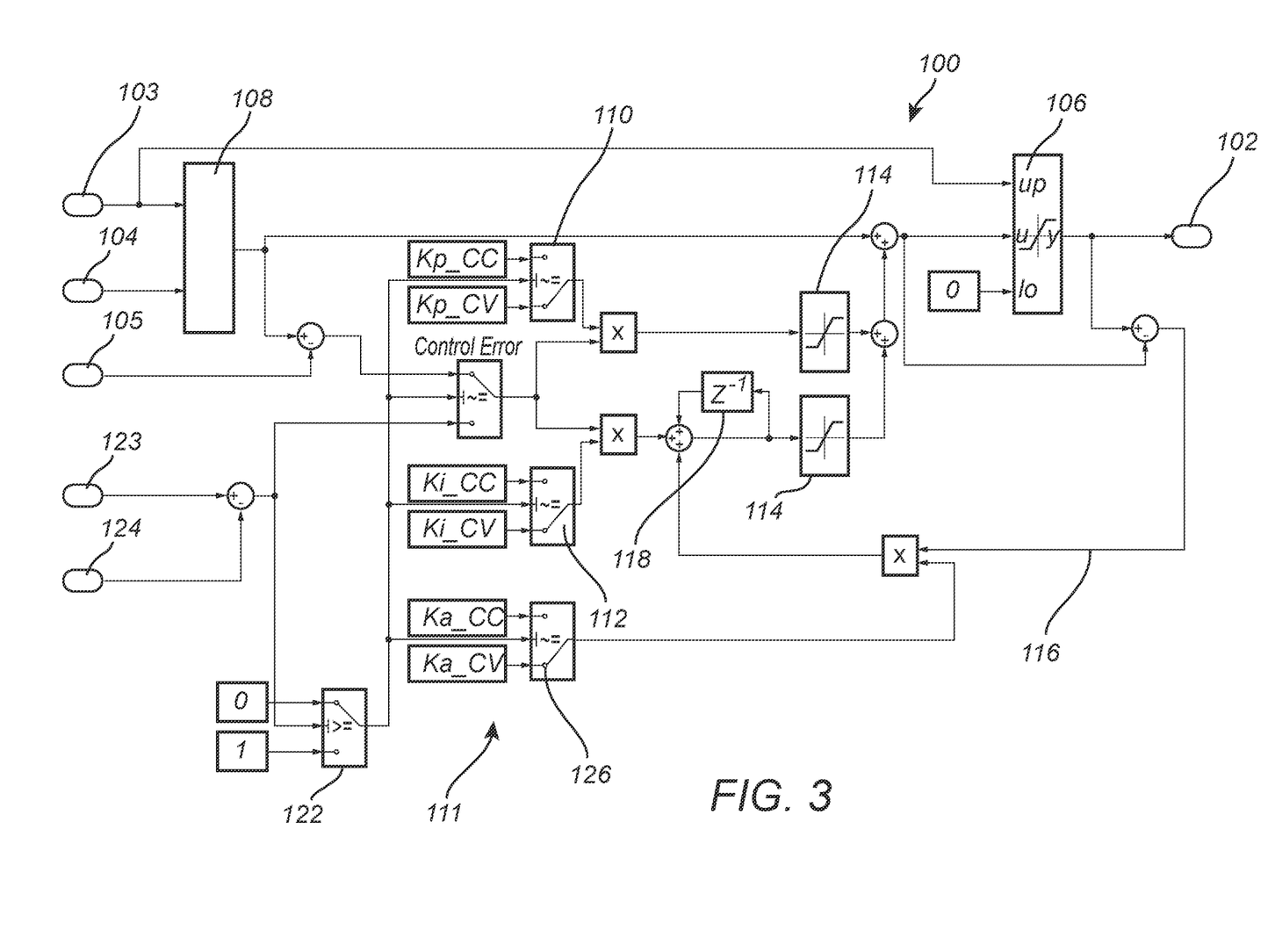
FIG. 3 is a schematic diagram of the charge controller of FIG. 2, highlighting an operation case where the charge controller of the present disclosure switches from current tracking to voltage tracking.

FIG. 3 is a schematic diagram of the charge controller 100 of FIG. 2, highlighting an operation case where the charge controller 100 of the present disclosure switches from current tracking to voltage tracking. Again, in embodiments, in response to the battery reaching the charge threshold, the charge controller 100 is configured to switch from a current tracking based control to a voltage tracking based control. Referring to FIG. 3, in embodiments, the switch from the current tracking based control is performed by switching the inputs from the current based inputs 103, 104, 105 to the voltage based inputs 123, 124, such as the cell voltage target 123 and the maximum cell voltage 124. By so doing, the tracking error becomes a voltage error rather than a current error. In these embodiments, the switch is also performed by switching the controller gains 110, 112, 126 from current to voltage.

Figure 4:
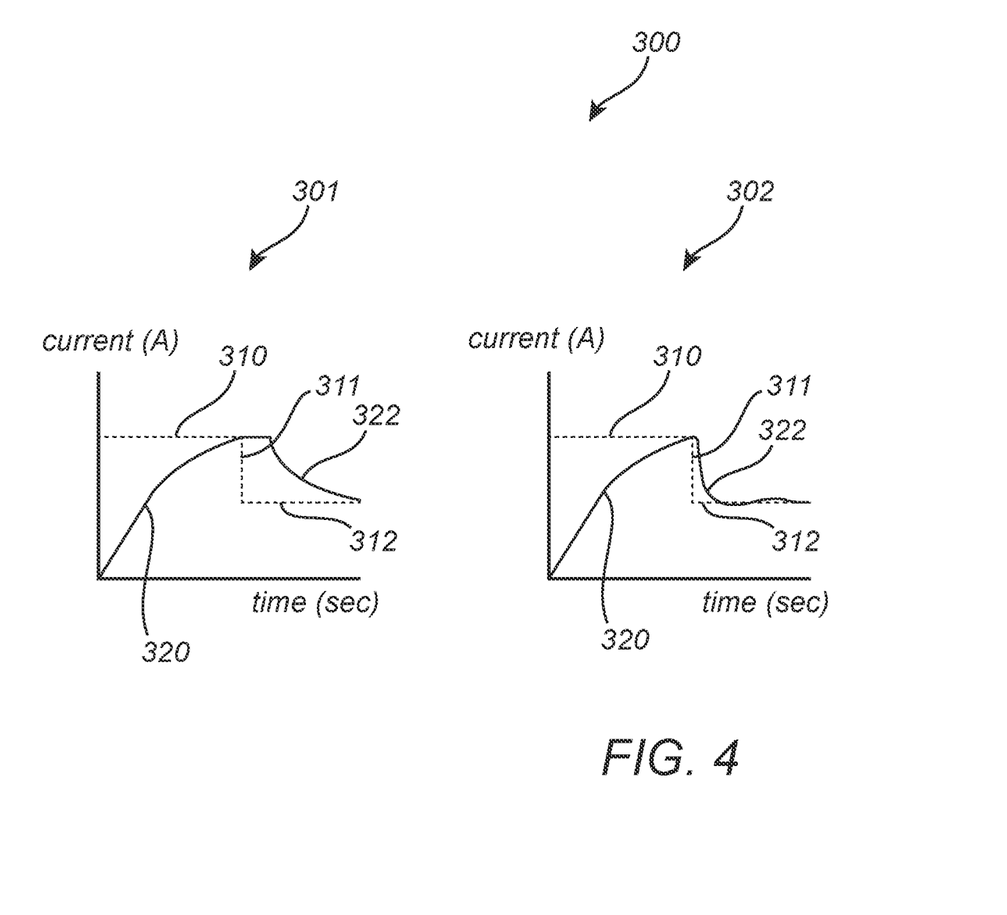
FIG. 4 is a schematic diagram illustrating a charge controller operation case in which the charger current limit is higher than the battery current limit and the charger current limit suddenly drops.

FIG. 4 is a schematic diagram illustrating a charge controller operation case in which the charger current limit is higher than the battery current limit and the charger current limit suddenly drops. Referring to FIG. 4, pane 301 illustrates a chart of the current over time of the charger/EVSE current limit and the actual battery current of a system without the charge controller 100 (such as where a standard controller is configured to compensate for auxiliary loads), while pane 302 illustrates a chart of the current over time of the charger/EVSE current limit and the actual battery current of a system with an embodiment of the charge controller 100.

Referring to pane 301, without the charge controller 100 (but rather with a standard controller configured to compensate for auxiliary loads), the actual battery current 320 with the higher charger/EVSE current limit 310 increases steadily and gradually to the value of the higher charger/EVSE current limit 310. The actual battery current 322, after the saturation bounds where there is a sudden drop 311 from the higher charger/EVSE current limit to the lower charger/EVSE current limit 312, is slow to respond and steadily and gradually decreases to the lower charger/EVSE current limit 312. In particular, as can be seen in pane 301, the actual battery current 322 remains at the higher charger/EVSE current limit 310 beyond the saturation bounds indicating windup past the saturation bounds.

Referring to pane 302, with the charge controller 100, similar to control without the charge controller 100, the actual battery current 320 with the higher charger/EVSE current limit 310 increases steadily and gradually to the value of the charger/EVSE current limit 310. However, unlike the control without the charge controller 100, with the charge controller 100, the actual battery current 322, after the saturation bounds where there is the sudden drop 311 from the higher charger/EVSE current limit 310 to the lower charger/EVSE current limit 312, quickly responds and reduces the current to the lower charger/EVSE current limit 312. As can be seen in pane 302, using the charged controller 100, the actual battery charging current closely conforms to the limitation situation experienced by the charger, that results in a quick reduction of the charger/EVSE current limit, without a significant lag/windup.

Figure 5:
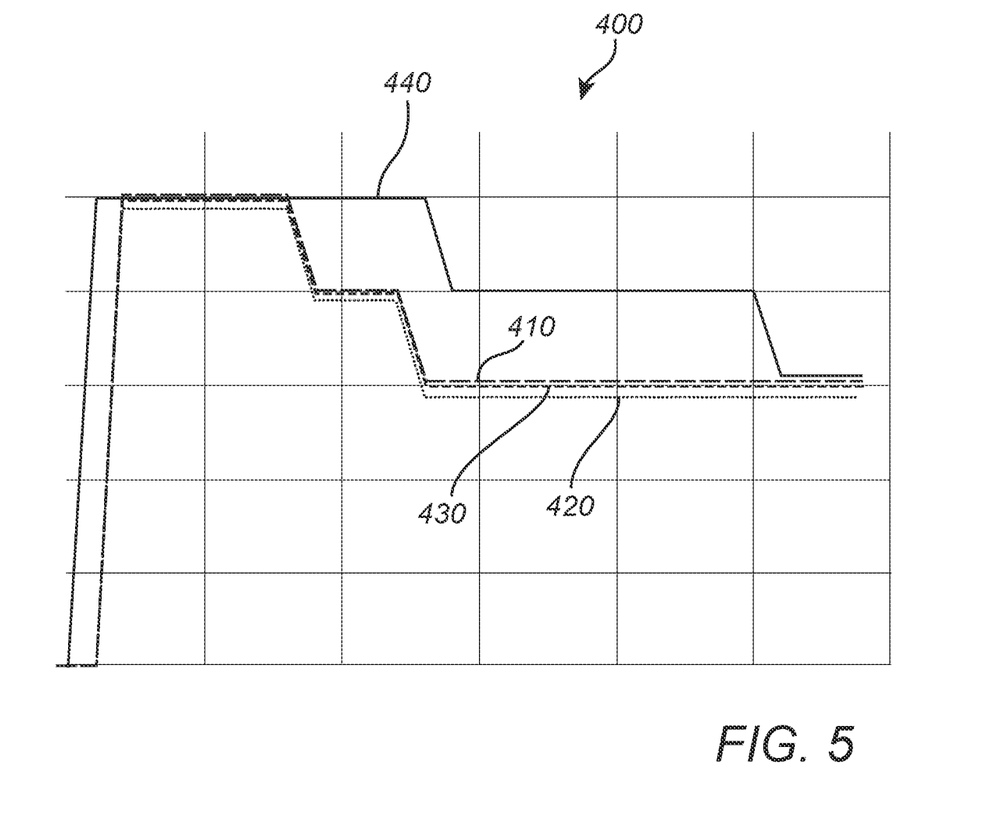
FIG. 5 is an illustrative charging profile achieved using the charge controller of the present disclosure, highlighting the control operation at the charger/EVSE current limit.
Figure 6:
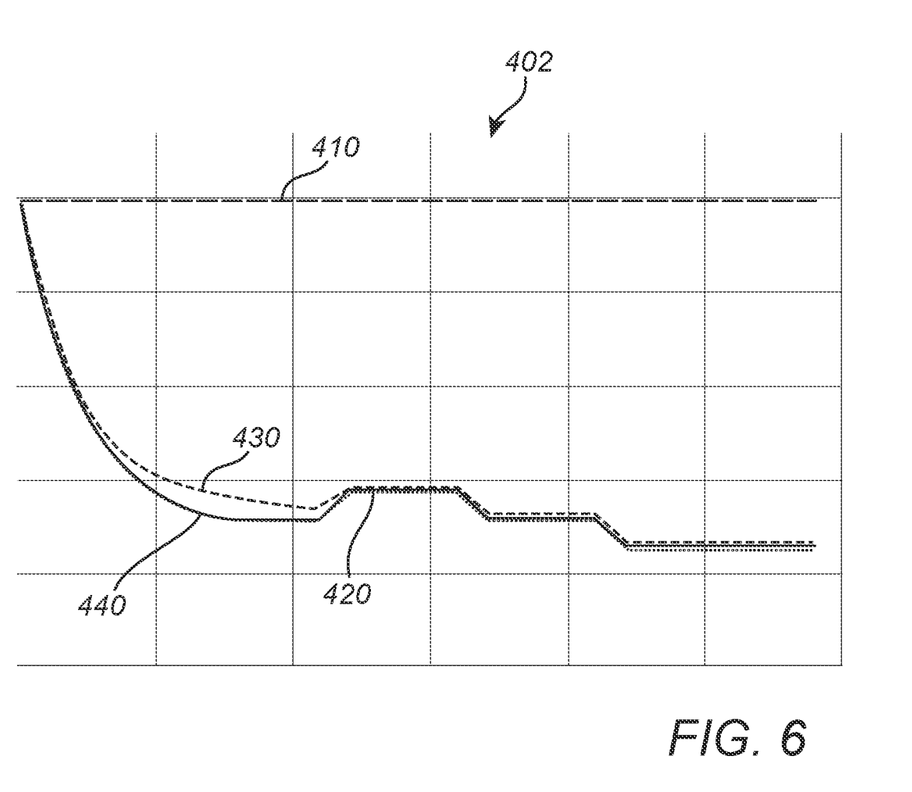
FIG. 6 is an illustrative charging profile achieved using the charge controller of the present disclosure, highlighting the control operation at the battery current limit.

FIG. 5 is an illustrative charging profile 400 achieved using the charge controller of the present disclosure, highlighting the control operation at the charger/EVSE current limit 410. FIG. 6 is an illustrative charging profile 402 achieved using the charge controller of the present disclosure, highlighting the control operation at the battery current limit 440. In FIGS. 5 and 6, the current over time of the charger/EVSE current limit 410, the actual battery current 420, the actual charger/EVSE current supplied 430, and the battery current limit 440 are plotted over time As can be seen in FIGS. 5 and 6, the actual battery current 420 tracks and is close to the lower of the charger/EVSE current limit 410 (FIG. 5) and the battery current limit 440 (FIG. 6), while the actual charger/EVSE current supplied 430 remains slightly above that of the actual battery current 420.

Figure 7:
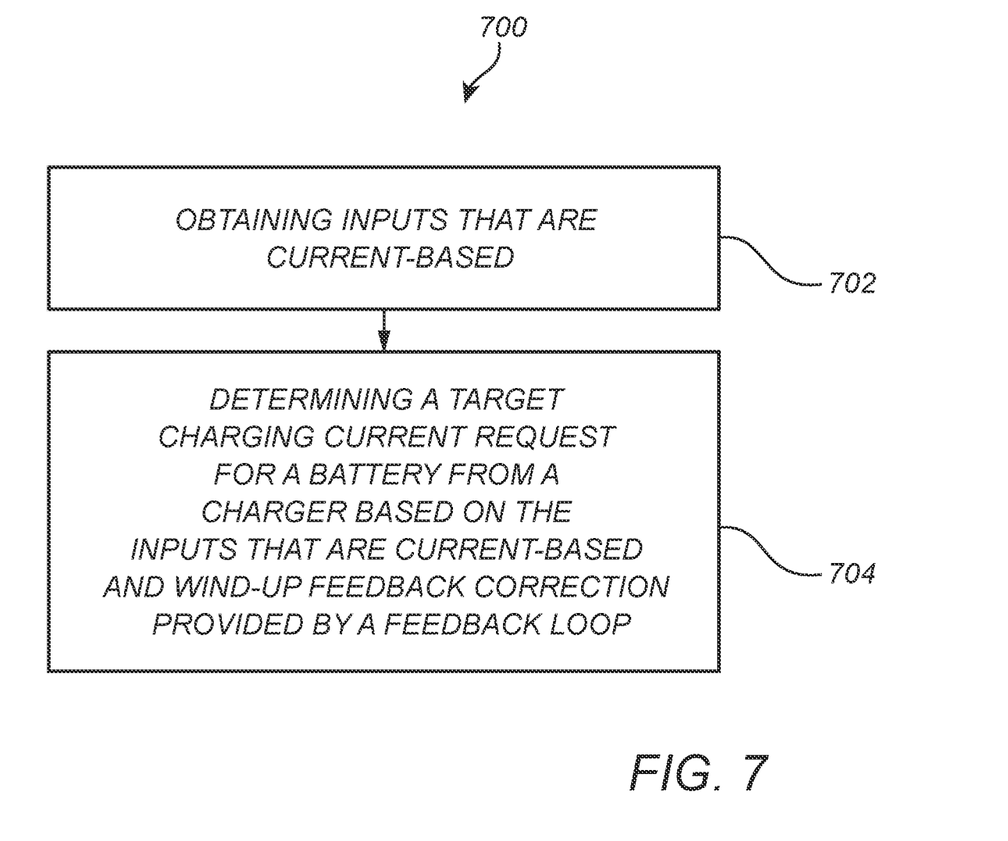
FIG. 7 is a flowchart of an illustrative embodiment of a method for charge control of the present disclosure.

FIG. 7 is a flowchart of an illustrative embodiment of a method 700 for charge control of the present disclosure. The method 700 includes obtaining inputs that are current-based at step 702. In some embodiments, the inputs that are current-based include a charger current limit, a battery current limit, and a measured battery current.

The method 700 also includes determining a target charging current request for a battery from a charger based on the inputs that are current-based and wind-up feedback correction provided by a feedback loop at step 704. In embodiments, the wind-up feedback correction corrects drift of the feedback controller while the battery current limit is beyond the maximum charger/EVSE current limit. In embodiments, the wind-up feedback correction is determined by monitoring uncontrolled drift of the feedback controller through a dynamic feedback loop-and-gain on the integral term.

In various embodiments, the method 700 includes determining a limiting charging current that is a minimum of the charger current limit and the battery current limit. In some of these embodiments, the method 700 includes utilizing a proportional-integral (PI) controller that is fed the limiting charging current and the measured battery current, the PI controller including a proportional gain path that is configured to add or subtract from a request for error correction and an integral gain path that is configured to prevent oscillation by accounting for historical errors. In some of these embodiments, the integral gain path is fed the wind-up feedback correction to account for transient errors.

In various embodiments, the method 700 includes transitioning, in response to a threshold voltage of the battery being reached, from a current-based implementation to a voltage-based implementation by determining the target charging current request for the battery from the charger based on inputs that are voltage-based. In some of these embodiments, the threshold voltage is a predetermined target voltage, such as max battery cell voltage. In other embodiments, the threshold voltage is a voltage range, such as a range defining voltages within a predetermined amount of a predetermined value In one embodiment, the voltage range includes voltages within a one millivolt (mV) window of max battery cell voltage. In various embodiments, the threshold voltage is adjusted for variability in the SOH of the battery and for a temperature of the battery pack.

In various embodiments, the method 700 also includes causing current available from the charger, that exceeds the determined current request, to be directed to a thermal management system associated with the battery.

Figure 8:
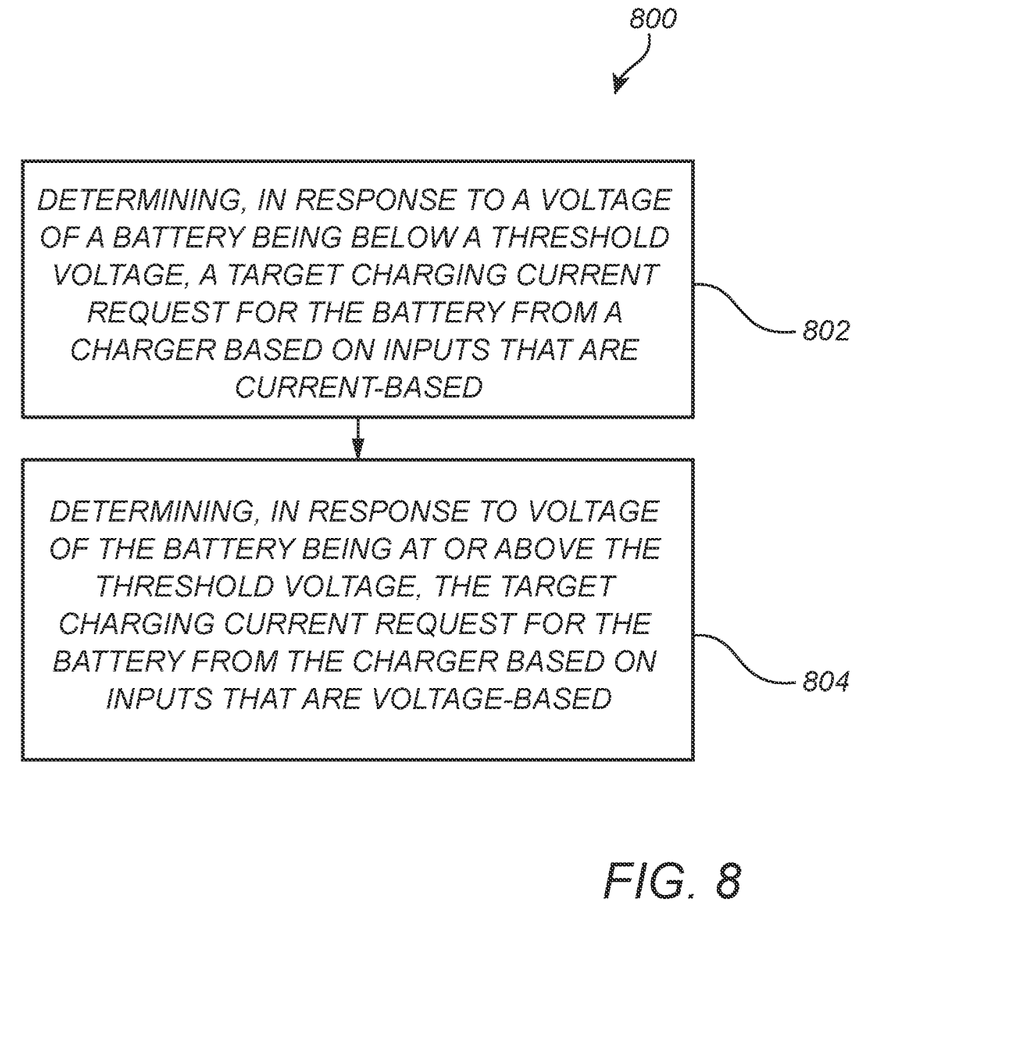
FIG. 8 is a flowchart of another illustrative embodiment of a method for charge control of the present disclosure.

FIG. 8 is a flowchart of another illustrative embodiment of a method 800 for charge control of the present disclosure. The method 800 includes determining, in response to a voltage of a battery being below a threshold voltage, a target charging current request for the battery from a charger based on inputs that are current-based at step 802. The method 800 also includes determining, in response to the voltage of the battery being at or above the threshold voltage, the target charging current request for the battery from the charger based on inputs that are voltage-based at step 804. In various embodiments, the inputs that are current-based include a charger current limit, a battery current limit, and a measured battery current and the inputs that are voltage-based include a cell voltage target and a maximum cell voltage.

In various embodiments, the threshold voltage is a predetermined value. In some of these embodiments, the threshold voltage is a predetermined target voltage, such as max battery cell voltage. In other embodiments, the threshold voltage is a voltage range, such as within a one millivolt (mV) window of max battery cell voltage. In various embodiments, the threshold voltage is adjusted for variability in the SOH of the battery and for a temperature of the battery pack.

In some of these embodiments, the threshold voltage is adjusted based on the predetermined value, a State of Health (SOH) of the battery, and a temperature of the battery.

In various embodiments, the target charging current request for the battery from the charger is further determined based on wind-up feedback correction provided by a feedback loop both above and below the threshold voltage. In embodiments, the wind-up feedback correction corrects drift of the actual battery current beyond the maximum charger/EVSE current limit. In embodiments, the wind-up feedback correction is determined by monitoring uncontrolled drift of the actual battery current through a dynamic feedback loop-and-gain on the integral term.

In various embodiments, the target charging current request for the battery from the charger is determined utilizing a proportional-integral controller. The proportional-integral controller includes a proportional gain path that is configured to add or subtract from a request for error correction and an integral gain path that is configured to prevent oscillation by accounting for historical errors. In some of these embodiments, the proportional gain path and the integral gain path are configured as current based gains while operating below the threshold voltage and are configured as voltage based gains while operating above the threshold voltage.

It is to be recognized that, depending on the example, certain acts or events of any of the techniques described herein, such as those in FIGS. 7 and 8, can be performed together, in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 9:
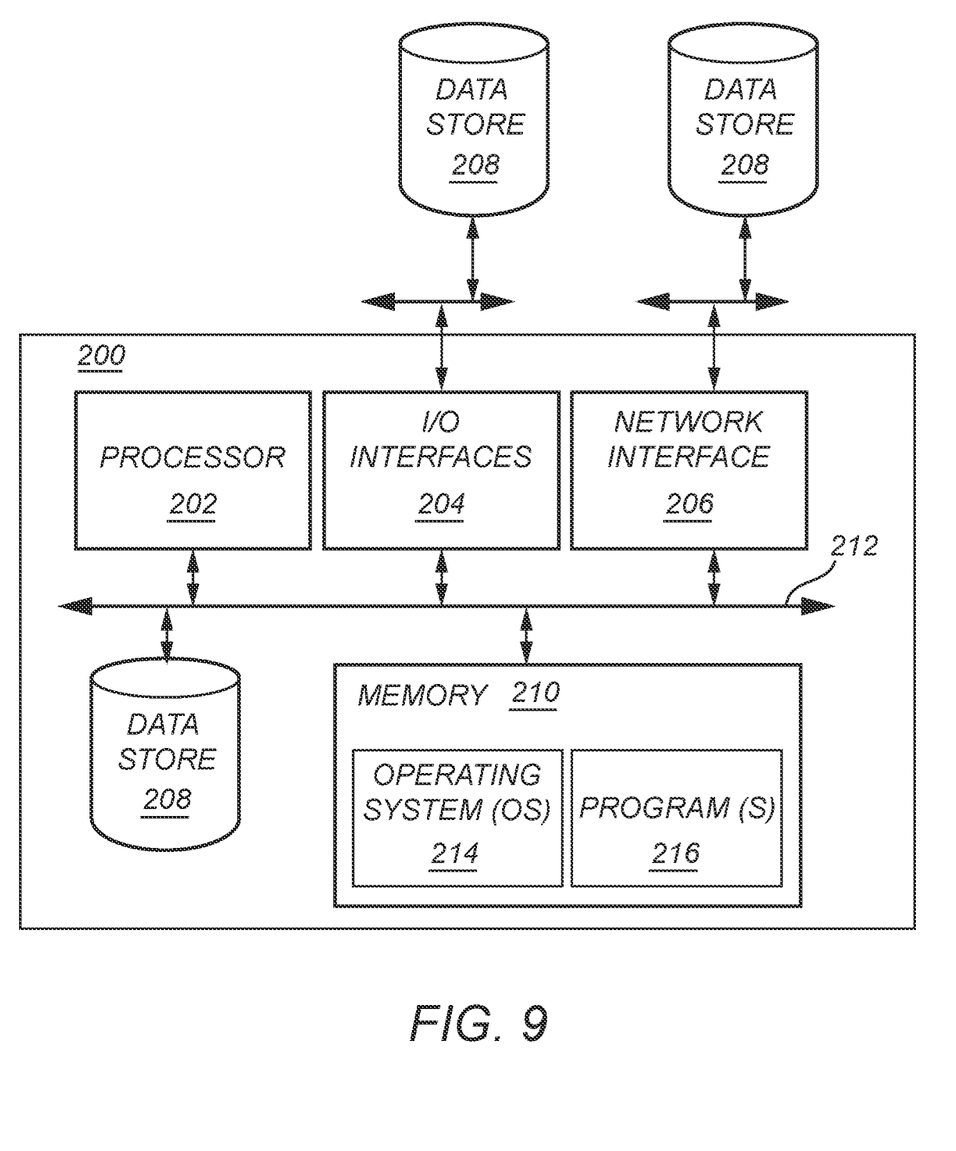
FIG. 9 is a schematic diagram of one illustrative embodiment of a processing system for implementing the charge controller of FIGS. 1 and 2.

FIG. 9 is a schematic diagram of a charge controller 200, which may be used in a charging system, a cloud-based system, in another system, or stand-alone in a charger/EVSE or a vehicle, for example. In various embodiments, the charge controller 200 is configured to perform any of the methods and processes disclosed herein. In some embodiments, the charge controller 200 includes a proportional-integral controller. The charge controller 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 9 depicts the charge controller 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but is not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the processing system 200, a semiconductor-based microprocessor (in the form of a microchip or chipset), or generally any device for executing software instructions. When the charge controller 200 is in operation, the processor 202 is configured to execute software stored within the memory 210, to communicate data to and from the memory 210, and to generally control operations of the charge controller 200 pursuant to the software instructions. The I/O interfaces 204 may be used to receive user input from and/or for providing system output to one or more devices or components.

The network interface 206 may be used to enable the processing system 200 to communicate on a network, such as the Internet. The network interface 206 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the processing system 200, such as, for example, an internal hard drive connected to the local interface 212 in the processing system 200. Additionally, in another embodiment, the data store 208 may be located external to the processing system 200 such as, for example, an external hard drive connected to the I/O interfaces 204 (e.g., a SCSI or USB connection). In a further embodiment, the data store 208 may be connected to the processing system 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable medium having computer-readable code stored thereon for programming a computer, server, appliance, device, processor, circuit, etc. each of which may include a processor to perform functions as described and claimed herein. Examples of such computer-readable mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A charge control system, comprising:
one or more processors; and
a memory storing computer-executable instructions that, when executed, cause the one or more processors to:
determine, in response to a voltage of a battery being below a threshold voltage, a target charging current request for a battery from a charger based on at least one current-based input and a wind-up feedback correction provided by a feedback loop; and
determine, in response to the voltage of the battery being at or above the threshold voltage, the target charging current request for the battery from the charger based on at least one voltage-based input,
wherein the threshold voltage is a voltage range defining voltages within a predetermined amount of a value, and the threshold voltage is adjusted based on the value, a State of Health (SOH) of the battery, and a temperature of the battery.

2. The charge control system of claim 1, wherein the current-based input includes at least one input selected from a charger current limit, a battery current limit, and a measured battery current.

3. The charge control system of claim 2, wherein the instructions that, when executed, cause the one or more processors to determine a limiting charging current that is a minimum of the charger current limit and the battery current limit.

4. The charge control system of claim 3, wherein the instructions that, when executed, cause the one or more processors to implement a proportional-integral (PI) controller that is fed the limiting charging current and the measured battery current, the PI controller including a proportional gain path that is configured to add or subtract from a request for error correction and an integral gain path that is configured to prevent oscillation by accounting for historical errors.

5. The charge control system of claim 4, wherein the integral gain path is fed the wind-up feedback correction to account for transient errors.

6. The charge control system of claim 1, wherein the instructions that, when executed, cause the one or more processors to, in response to a threshold voltage of the battery being reached, transition from a current-based implementation to a voltage-based implementation by determining the target charging current request for the battery from the charger based on inputs that are voltage-based.

7. The charge control system of claim 1, wherein the wind-up is a remaining error after corrections are applied by a proportional and integral control, implemented by the one or more processors, and the wind-up feedback correction is determined by monitoring a drift of the feedback controller through a derivative control to correct the remaining error on an integral term.

8. A charge control method, comprising:
obtaining at least one current-based input;
determining, in response to a voltage of a battery being below a threshold voltage, a target charging current request for a battery from a charger based on the at least one current-based input and a wind-up feedback correction provided by a feedback loop; and
determining, in response to the voltage of the battery being at or above the threshold voltage, the target charging current request for the battery from the charger based on at least one voltage-based input,
wherein the threshold voltage is a voltage range defining voltages within a predetermined amount of a value, and the threshold voltage is adjusted based on the value, a State of Health (SOH) of the battery, and a temperature of the battery.

9. The charge control method of claim 8, wherein the current-based input includes at least one input selected from a charger current limit, a battery current limit, and a measured battery current.

10. The charge control method of claim 9, further comprising determining a limiting charging current that is a minimum of the charger current limit and the battery current limit.

11. The charge control method of claim 10, further comprising utilizing a proportional-integral (PI) controller that is fed the limiting charging current and the measured battery current, the PI controller including a proportional gain path that is configured to add or subtract from a request for error correction and an integral gain path that is configured to prevent oscillation by accounting for historical errors.

12. The charge control method of claim 11, wherein the integral gain path is fed the wind-up feedback correction to account for transient errors.

13. The charge control method of claim 8, further comprising transitioning, in response to a threshold voltage of the battery being reached, from a current-based implementation to a voltage-based implementation by determining the target charging current request for the battery from the charger based on inputs that are voltage-based.

14. The charge control method of claim 8, wherein the wind-up is a remaining error after corrections are applied by a proportional and integral control, implemented by one or more processors, and the wind-up feedback correction is determined by monitoring a drift of the feedback controller through a derivative control to correct the remaining error on an integral term.

15. A charge control method, comprising:
determining, in response to a voltage of a battery being below a threshold voltage, a target charging current request for the battery from a charger based on at least one current-based input; and
determining, in response to the voltage of the battery being at or above the threshold voltage, the target charging current request for the battery from the charger based on at least one voltage-based input,
wherein the threshold voltage is a voltage range defining voltages within a predetermined amount of a value, and the threshold voltage is adjusted based on the value, a State of Health (SOH) of the battery, and a temperature of the battery.

16. The charge control method of claim 15, wherein the current-based input includes at least one input selected from a charger current limit, a battery current limit, and a measured battery current.

17. The charge control method of claim 16, comprising:
determining a limiting charging current that is a minimum of the charger current limit and the battery current limit.

18. The charge control method of claim 15, wherein the voltage-based input includes at least one input selected from a cell voltage target and a maximum cell voltage.

19. The charge control method of claim 15, wherein the target charging current request for the battery from the charger is further determined based on wind-up feedback correction provided by a feedback loop both above and below the threshold voltage.

20. The charge control method of claim 19, wherein the wind-up is a remaining error after corrections are applied by a proportional and integral control, implemented by one or more processors, and the wind-up feedback correction is determined by monitoring a drift of the feedback controller through a derivative control to correct the remaining error on an integral term.

* * * * *